(12) United States Patent
Guerin

(10) Patent No.: US 10,384,357 B2
(45) Date of Patent: Aug. 20, 2019

(54) RIGID TEMPORARY ATTACHMENT DEVICE FOR A ROBOTIC GRIPPER

(71) Applicant: THE JOHNS HOPKINS UNIVERSITY, Baltimore, MD (US)

(72) Inventor: Kelleher Guerin, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 519 days.

(21) Appl. No.: 15/251,736

(22) Filed: Aug. 30, 2016

(65) Prior Publication Data

US 2017/0066140 A1  Mar. 9, 2017

Related U.S. Application Data

(60) Provisional application No. 62/215,552, filed on Sep. 8, 2015.

(51) Int. Cl.
*B25J 15/04* (2006.01)
*B25J 19/00* (2006.01)

(52) U.S. Cl.
CPC ....... *B25J 19/0091* (2013.01); *B25J 15/0433* (2013.01); *Y10S 901/41* (2013.01)

(58) Field of Classification Search
CPC ..... Y10T 403/32606; Y10T 403/32614; Y10T 403/32819; Y10T 403/32844; Y10T 403/7047; Y10T 403/7049; Y10T 403/7051; Y10T 403/7052; Y10T 403/7056; Y10T 403/7061; B25J 15/04; B25J 15/0408; B25J 15/0433; B25J 19/0091; Y10S 901/30; Y10S 901/31; Y10S 901/41
See application file for complete search history.

(56) References Cited

U.S. PATENT DOCUMENTS

| 4,281,447 A | 8/1981 | Miller et al. |
| 4,781,519 A | 11/1988 | Monforte |
| 4,830,569 A | 5/1989 | Jannborg |
| 4,875,560 A * | 10/1989 | Imaizumo ............... F16F 9/462 |
| | | 188/282.2 |

(Continued)

FOREIGN PATENT DOCUMENTS

JP  04-189489 A  7/1992

OTHER PUBLICATIONS

International Search Report and Written Opinion for PCT/US2016/049447 dated Dec. 8, 2016.

(Continued)

*Primary Examiner* — Jonathan P Masinick
(74) *Attorney, Agent, or Firm* — MH2 Technology Law Group, LLP

(57) ABSTRACT

An attachment device includes a robot-engaging portion having a recess formed in an outer surface thereof for receiving a finger of a robot. The attachment device also includes a tool-engaging portion coupled to the robot-engaging portion. The tool-engaging portion is configured to be coupled to a tool that is to be used by the robot to perform a task. A damping member is positioned at least partially between the robot-engaging portion and the tool-engaging portion. The damping member is configured to be adjusted to vary a magnitude of oscillations that are transferred from the tool-engaging portion to the robot-engaging portion.

20 Claims, 6 Drawing Sheets

(56) References Cited

U.S. PATENT DOCUMENTS

| | | | | |
|---|---|---|---|---|
| 5,265,495 | A | * 11/1993 | Bung | F16C 1/108 |
| | | | | 403/120 |
| 5,466,025 | A | 11/1995 | Mee | |
| 5,993,365 | A | 11/1999 | Stagnitto et al. | |
| 7,753,146 | B2 | * 7/2010 | Miyazaki | B62D 57/032 |
| | | | | 180/8.5 |
| 8,056,949 | B1 | 11/2011 | Shaker et al. | |
| 8,371,190 | B2 | 2/2013 | Miller | |
| 8,403,081 | B2 | * 3/2013 | Alfayad | B62D 57/032 |
| | | | | 180/8.1 |
| 2006/0083585 | A1 | * 4/2006 | Lew | B62D 21/155 |
| | | | | 403/365 |

OTHER PUBLICATIONS

Christian Balkenius; "Spatial Learning With Perceptually Grounded Representations"; Robotics and Antonomous Systems 25; 1998; pp. 165-175.

Kelleher R. Guerin, et al.; "Adjutant: A Framework for Flexible Human-Machine Collaborative Systems"; 2014 IEEE/RSJ International Conference on Intelligent Robots and Systems (IROS 2014); Sep. 14-18, 2014; 8 pgs.

Zhe Xu, et al., "Enhanced Robotic Cleaning With a Low-Cost Tool Attachment"; 2014 IEEE/RSJ International Conference on Intelligent Robots and Systems (IROS 2014); Sep. 14-18, 2014; 7 pgs.

* cited by examiner

RIGID TEMPORARY ATTACHMENT DEVICE FOR A ROBOTIC GRIPPER

CROSS-REFERENCE TO RELATED APPLICATIONS

This application claims priority to U.S. Provisional Patent Application No. 62/215,552, filed on Sep. 8, 2015, the disclosure of which is incorporated by reference herein in its entirety.

BACKGROUND

Robots are often used to perform tasks with tools. The tools, however, when designed for use by people (e.g., a screwdriver), may be difficult for the robot to grasp and use. One solution to this problem is to secure the tool to the robot using fastening devices such as screws, bolts, or other fasteners. This, however, requires a user to manually couple the tool to the robot using the fastening device. If the robot then needs to perform another task using another tool, the user must remove the fastening device so that the tool may be decoupled from the robot. What is needed is an improved system and method for allowing a robot to quickly and easily grab and use different tools.

SUMMARY

An attachment device is disclosed. The attachment device includes a robot-engaging portion having a recess formed in an outer surface thereof for receiving a finger of a robot. The attachment device also includes a tool-engaging portion coupled to the robot-engaging portion. The tool-engaging portion is configured to be coupled to a tool that is to be used by the robot to perform a task. A damping member is positioned at least partially between the robot-engaging portion and the tool-engaging portion. The damping member is configured to be adjusted to vary a magnitude of oscillations that are transferred from the tool-engaging portion to the robot-engaging portion.

In another embodiment, the attachment device includes a robot-engaging portion having a recess formed in an outer surface thereof for receiving a finger of a robot. A tool-engaging portion is coupled to the robot-engaging portion. The tool-engaging portion is configured to be coupled to a tool that is to be used by the robot to perform a task. The attachment device also includes a member including a hollow outer portion and a hollow inner portion. The outer portion is positioned at least partially between the robot-engaging portion and the tool engaging portion. The inner portion is positioned at least partially within the tool-engaging portion. The outer portion and the inner portion are made from electrically-isolating materials, and the member is configured to be adjusted to vary a magnitude of oscillations that are transferred from the tool-engaging portion to the robot-engaging portion.

A method for performing a task with a robot is also disclosed. The method includes coupling an attachment device to a tool. The attachment device includes a tool-engaging portion configured to be coupled to the tool. The attachment device also includes a robot-engaging portion coupled to the tool-engaging portion. The robot-engaging portion has a recess formed in an outer surface thereof. The attachment device further includes a damping member positioned at least partially between the robot-engaging portion and the tool-engaging portion. A finger of the robot is moved such that the finger is received within the recess in the attachment device. The damping member is adjusted to vary a magnitude of oscillations that are transferred from the tool to the robot.

Additional advantages of the embodiments will be set forth in part in the description which follows, and in part will be understood from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Figure 1:
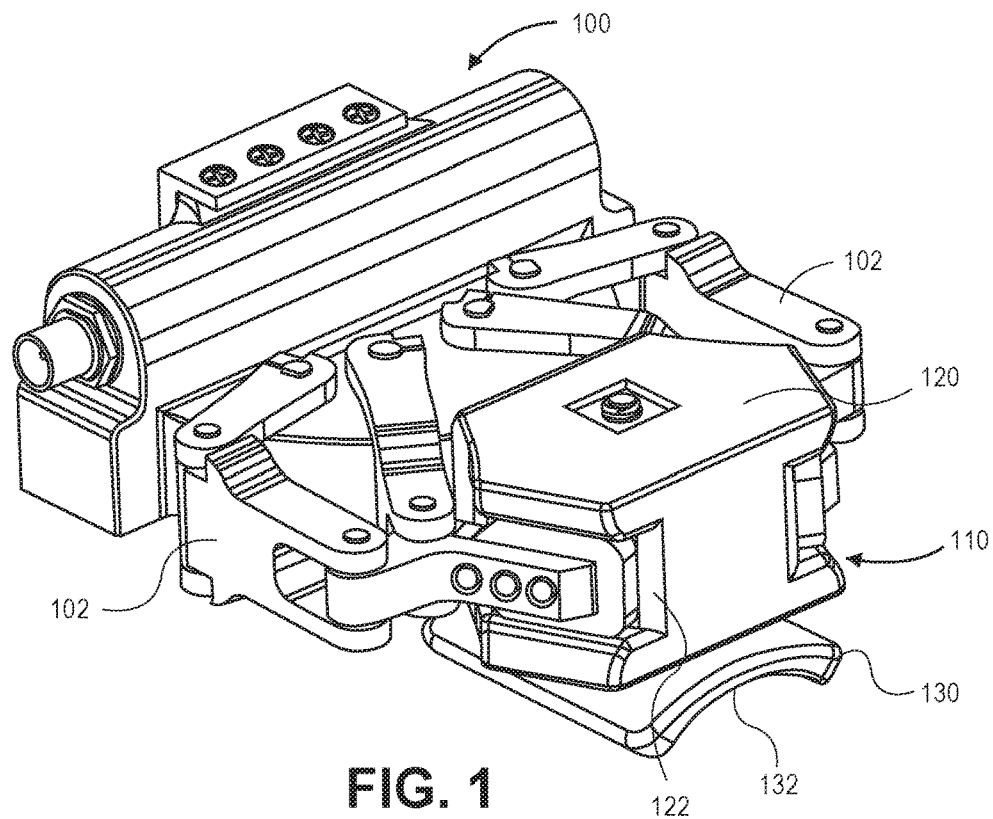
FIG. 1 depicts a perspective view of a robot grasping or engaging an attachment device, according to an embodiment.

FIG. 1 depicts a perspective view of a portion of a robot (e.g., an end effector) 100 grasping an attachment device 110, according to an embodiment. The end effector 100 may include one or more fingers (two are shown: 102). The end effector 100 may move the fingers 102 in one, two, or three dimensions. For example, the end effector 100 may move the fingers 102 toward one another, causing the fingers 102 to grasp the attachment device 110.

The attachment device 110 may include a first, robot-engaging portion 120 that is adapted to receive and be grasped by the fingers 102 of the end effector 100. The robot-engaging portion 120 may include one or more recesses (two are shown: 122) that are formed in the outer surface thereof. As shown, the recesses 122 are formed on opposing sides of the robot-engaging portion 120; however, in other embodiments, the recesses 122 may be formed on any outer surface (e.g., top, bottom, side, etc.) of the robot-engaging portion 120. As discussed in more detail below, the outer surface of the robot-engaging portion 120 (e.g., the recesses 122) and the fingers 102 of the end effector 100 may have complimentary shapes, so as to allow the fingers 102 to securely grasp the attachment device 110.

The attachment device 110 may also include one or more second, tool-engaging portions (one is shown: 130) that is/are adapted to be coupled with a tool. The robot-engaging portion 120 and the tool-engaging portion(s) 130 may be coupled to one another as described in greater detail below. As shown, the tool-engaging portion 130 includes a generally arcuate outer surface 132 that is configured to engage a tool with a corresponding arcuate surface (e.g., a sander). However, as will be appreciated, the shape and size of the tool-engaging portion 130 may vary depending upon the tool with which it is designed to engage.

Figure 2:
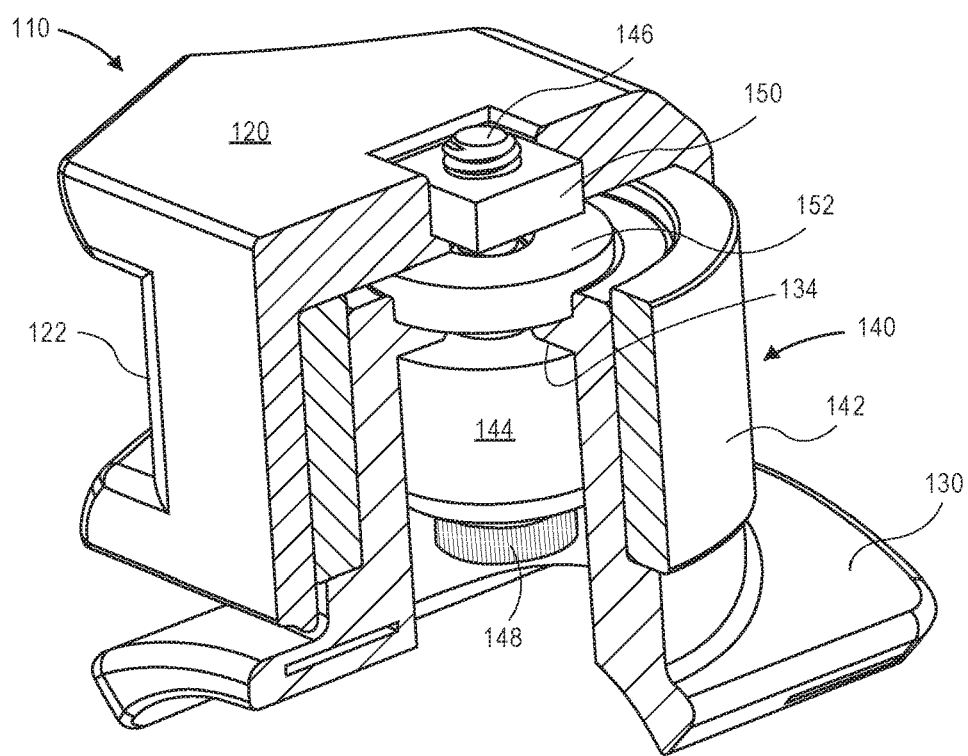
FIG. 2 depicts a partial cross-section of a perspective view of the attachment device, according to an embodiment.

FIG. 2 depicts a partial cross-section of a perspective view of the attachment device 110, according to an embodiment. The tool-engaging portion 130 may be at least partially positioned within (e.g., radially-inward from) the robot-engaging portion 120. A damping member 140 may also be at least partially positioned within the robot-engaging portion 120, the tool-engaging portion 130, or both. As shown, the damping member 140 may include a first, outer portion 142 and a second, inner portion 144. The outer portion 142 of the damping member 140 may be positioned (e.g., radially) between the robot-engaging portion 120 and the tool-engaging portion 130. The outer portion 142 of the damping member 140 may be in the form of a hollow cylinder. The outer portion 142 of the damping member 140 may be made from an elastomer such as rubber.

The inner portion 144 of the damping member 140 may be positioned (e.g., radially) inward from the outer portion 142 of the damping member 140 and from the tool-engaging portion 130. The inner portion 144 of the damping member 140 may also be in the form of a hollow cylinder and be made from an elastomer such as rubber. In one embodiment, the inner portion 144 of the damping member 140 may be made from a softer (i.e., less rigid) material than the outer portion 142 of the damping member 140.

The damping member 140 may also include a shaft 146 that extends at least partially through the inner portion 144 of the damping member 140. As shown, the shaft 146 may have threads on an external surface thereof. The shaft 146 may have a head 148 coupled to or integral with an end thereof. The head 148 may be positioned at least partially within the tool-engaging portion 130 (as shown), or the head 148 may be positioned external to the tool-engaging portion 130 so that the head 148 may be rotated when the tool-engaging portion 130 is engaged with a tool.

A bolt 150 may be positioned around the shaft 146. The bolt 150 may be secured in place and prevented from rotating by engagement with the robot-engaging portion 120 or with the tool-engaging portion 130. As shown, the bolt 150 may be positioned within a recess in the robot-engaging portion 120 such that the bolt 150 is prevented from rotating together with the shaft 146.

A washer 152 may be positioned around the shaft 146. More particularly, the washer 152 may be positioned between the bolt 150 and the head 148. The tool-engaging portion 130 may include an inner shoulder 134 that extends (e.g., radially) inward therefrom such that it is positioned axially between the washer 152 and the inner portion 144 of the damping member 140.

When a user rotates the head 148 (and the shaft 146) in a first direction, the head 148 and the shaft 146 may move axially-toward the bolt 150, thereby compressing the inner portion 144 of the damping member 140. This may increase the damping effect between the robot-engaging portion 120 and the tool-engaging portion 130, which reduces, restricts, dissipates, or prevents oscillations from a tool (e.g., a sander) from being transmitted from the tool-engaging portion 130 to the robot-engaging portion 120. When the user rotates the head 148 (and the shaft 146) in a second, opposing direction, the head 148 and the shaft 146 may move axially-away from the bolt 150, thereby de-compressing the inner portion 144 of the damping member 140. This may reduce the damping effect between the robot-engaging portion 120 and the tool-engaging portion 130 which may allow a greater magnitude of the oscillations from the tool to be transmitted from the tool-engaging portion 130 to the robot-engaging portion 120. This allows for a variable-stiffness mechanical connection between the tool-engaging portion 130 and the robot-engaging portion 120. In another embodiment, the damping member 140 may act to electrically isolate the tool-engaging portion 130 and the robot-engaging portion 120. In yet another embodiment, the damping member 140 may be an electrostatic dissipative member that at least partially prevents electrical pulses from being transmitted from the tool-engaging portion 130 to the robot-engaging portion 120.

Figure 3:
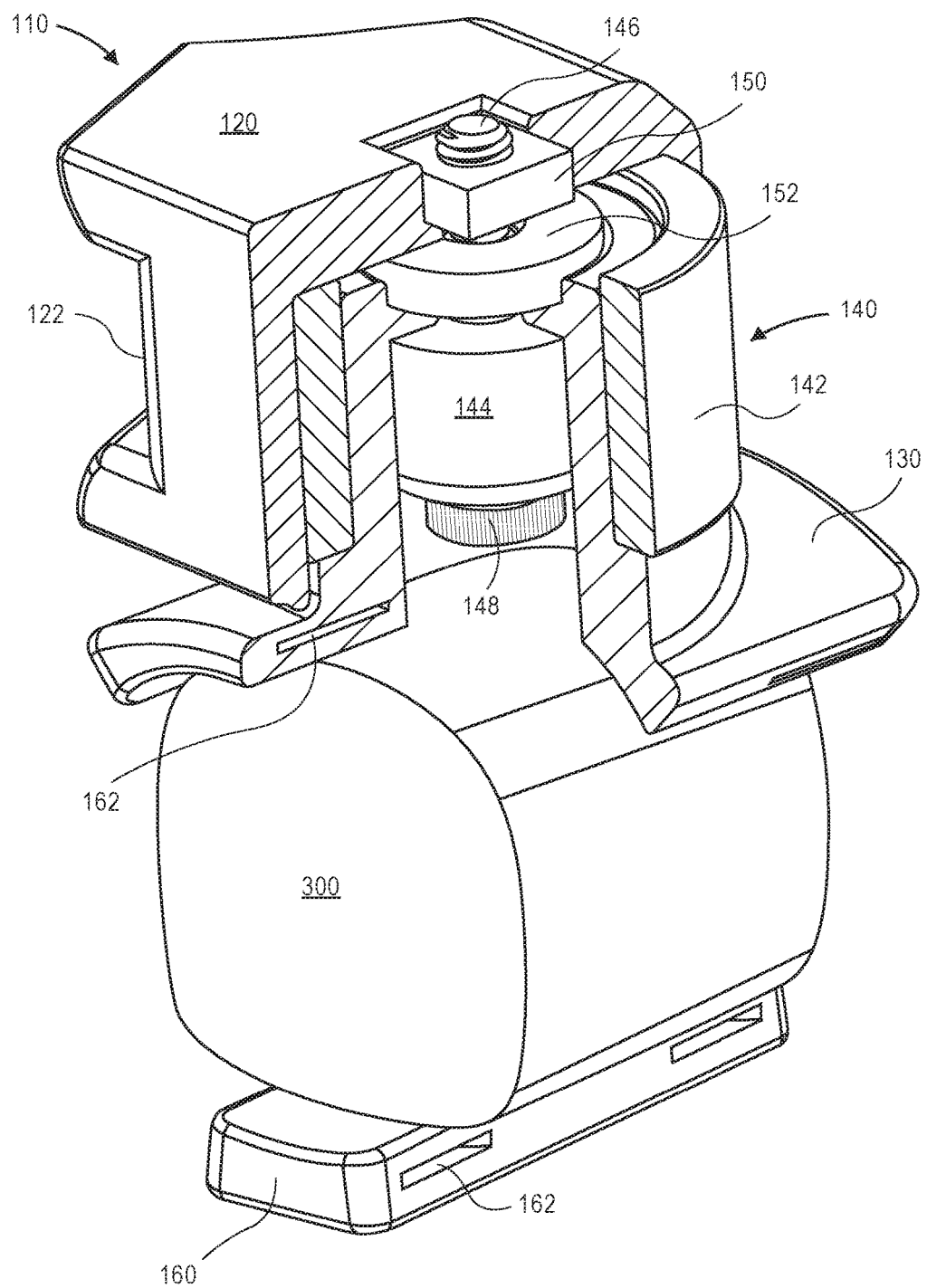
FIG. 3 depicts a perspective view of the attachment device coupled to a tool, according to an embodiment.

FIG. 3 depicts a perspective view of the attachment device 110 coupled to a tool 300, according to an embodiment. The outer surface 132 of the tool-engaging portion 130 may be placed in contact with the tool 300. As shown, the outer surface 132 of the tool-engaging portion 130 and the tool 300 have a similar arcuate profile; however, as stated above, the profile of the tool-engaging portion 130 and the tool 300 may vary.

In one embodiment, a handle support 160 may be placed in contact with the tool 300 such that the tool 300 is positioned between the tool-engaging portion 130 and the handle support 160. The tool-engaging portion 130 and the handle support 160 may include recesses or openings 162 formed at least partially therethrough. A fastening device such as a strap or cable may be inserted into or through the openings 162 and tightened to secure the tool 300 to the tool-engaging portion 130 and the handle support 160. In another embodiment, the handle support 160 may be omitted. Rather, the tool-engaging portion 130 may be coupled to the tool 300 using fastening devices such as screws, bolts, clamps, adhesives, and the like.

Figure 4:
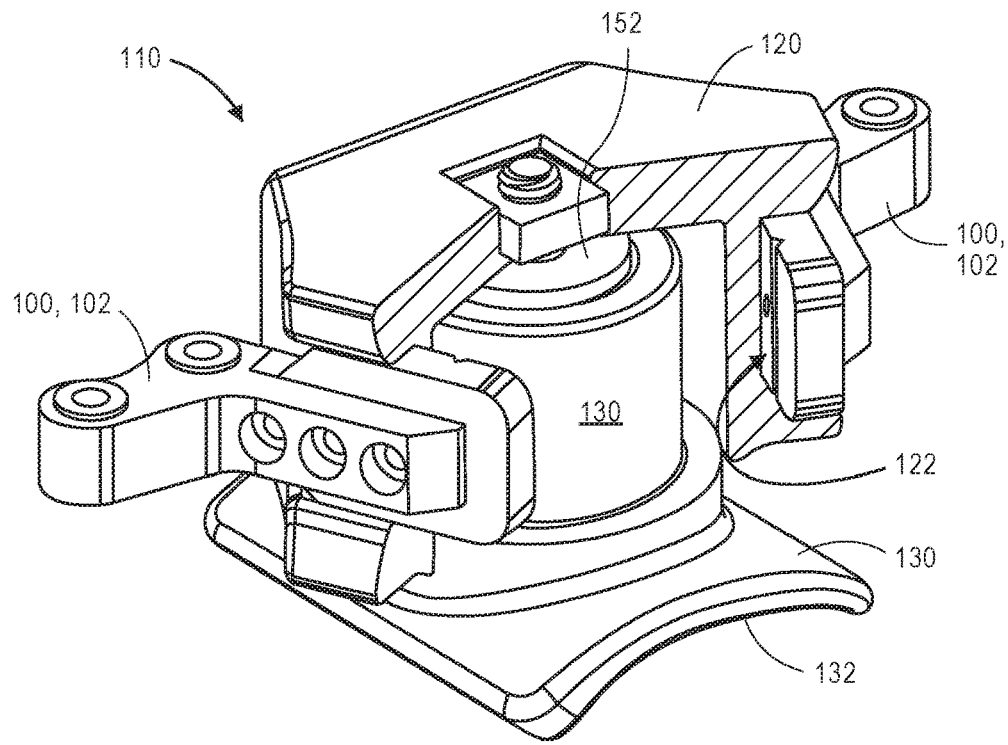
FIG. 4 depicts a partial cross-section of a perspective view of the robot grasping or engaging the attachment device, according to an embodiment.

FIG. 4 depicts a partial cross-section of a perspective view of the end effector 100 of the robot grasping the attachment device 110, according to an embodiment. As shown, the fingers 102 of the end effector 100 may move toward one another to be positioned at least partially within the recesses 122 in the robot-engaging portion 120 of the attachment device 110. Once positioned within the recesses 122, the end effector 100 may continue applying a force on the robot-engaging portion 120 to prevent the fingers 102 from sliding out of the recesses 122. This may allow the end effector 100 to pick up the tool 300 and/or use the tool 300 to perform tasks. When the end effector 100 is finished using the tool 300, the end effector 100 may move the fingers 102, causing the fingers 102 to release the robot-engaging portion 120 of the attachment device 110. Thus, the attachment device 110 may remain coupled to the tool 300.

Figure 5:
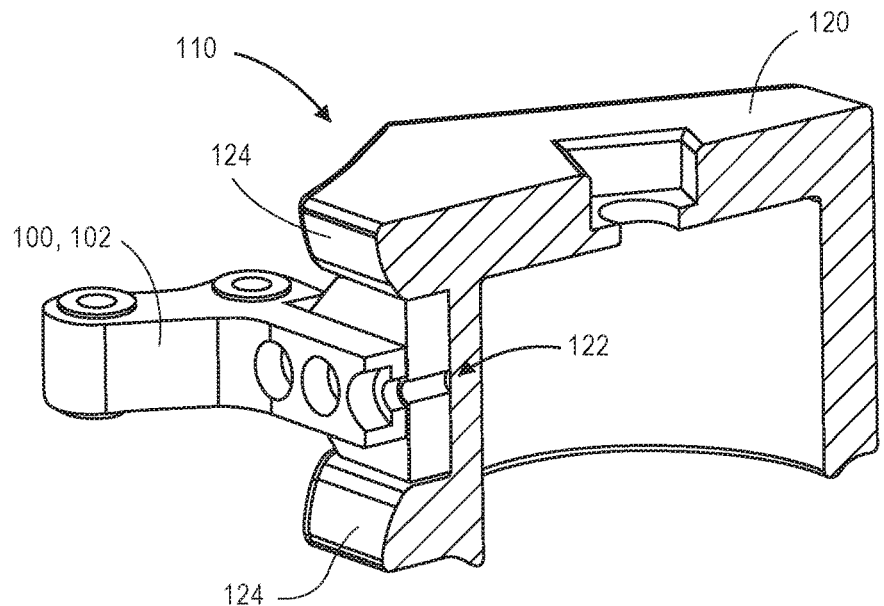
FIG. 5 depicts a partial cross-section of a perspective view of the robot grasping or engaging the attachment device, with a tool-engaging portion and a damping member removed for clarity, according to an embodiment.

FIG. 5 depicts a partial cross-section of a perspective view of the fingers 102 of the end effector 100 engaging the attachment device 110, with the tool-engaging portion 130 and the damping member 140 removed for clarity, according to an embodiment. The outer surface 124 of the robot-engaging portion 120 that is outside but proximate to the recesses 122 may be curved or sloped. In some instances, the fingers 102 of the end effector 100 may be initially slightly misaligned with the recesses 122 in the robot-engaging portion 120. When this occurs, the fingers 102 may contact the curved or sloped portion of the outer surface 124 of the robot-engaging portion 120, which may cause the fingers 102 to slide into the recesses 122.

The recesses 122 may be shaped and sized to form a tight fit with the fingers 102 of the end effector 100. As shown, the cross-sectional shape of the fingers 102 of the end effector 100 is rectangular, and the recesses 122 have a corresponding shape. Thus, when the fingers 102 are inserted into the recesses 122, there may be very little, if any, space for the fingers 102 to move around within the recesses 122. This may ensure a more secure coupling between the fingers 102 and the robot-engaging portion 120.

Figure 6:
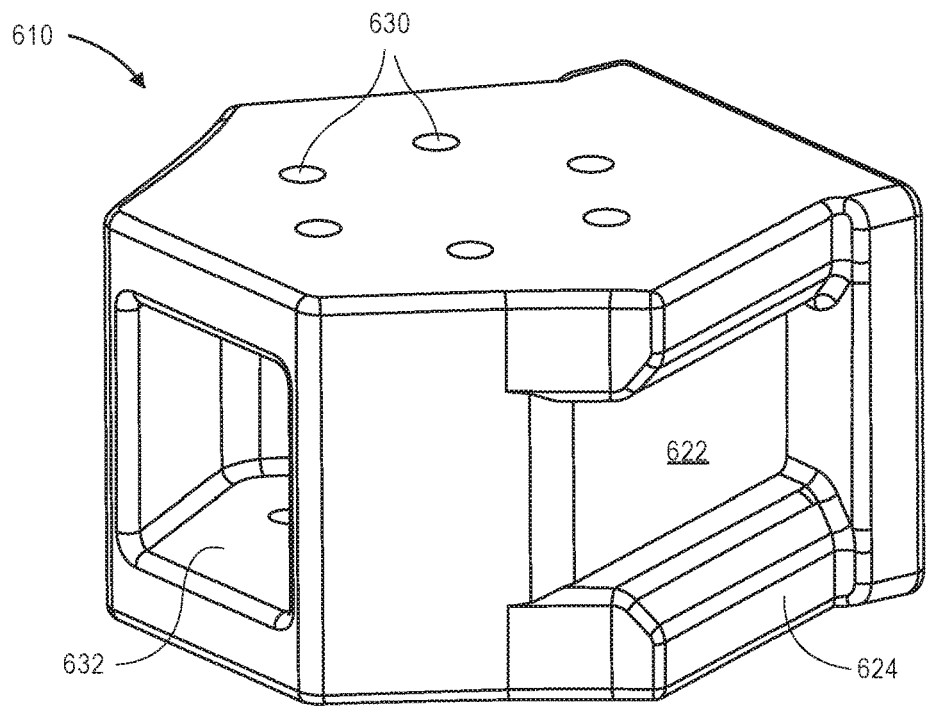
FIG. 6 depicts a perspective view of another attachment device, according to an embodiment.

FIG. 6 depicts a perspective view of another attachment device 610, according to an embodiment. The attachment device 610 may be one integral component. The attachment device 610 may include recesses 622 formed in the outer surface 624 thereof for receiving the fingers 102 of the end effector 100. The recesses 622 may be formed on opposing sides of the attachment device 610.

The attachment device 610 may also include one or more openings 630 formed at least partially therethrough. As shown, the openings 630 may be formed on a different side than the recesses 622. For example, the openings 630 may be formed on a top or bottom of the attachment device 610 while the recesses 622 may be formed on the sides of the attachment device 610. The openings 630 may be configured to receive fastening devices that are used to couple the attachment device 610 to the tool 300. For example, screws, bolts, or the like may be inserted at least partially into the openings 630 in the attachment device 610 and at least partially into corresponding openings in the tool 300 to couple the attachment device 610 to the tool 300.

The attachment device 610 may also include one or more additional voids or recesses 632 formed therein. As shown, one additional recess 632 is formed in the outer surface of the attachment device 610 between the recesses 622 that are for receiving the fingers 102 of the end effector 100. The additional recess(es) 632 may serve to reduce the weight of the attachment device 610. Thus the additional recess(es) 632 may be positioned anywhere on or within the attachment device 610 that does not interfere with the structural integrity of the attachment device 610 or interfere with the coupling to the end effector 100 or the tool 300.

Figure 7:
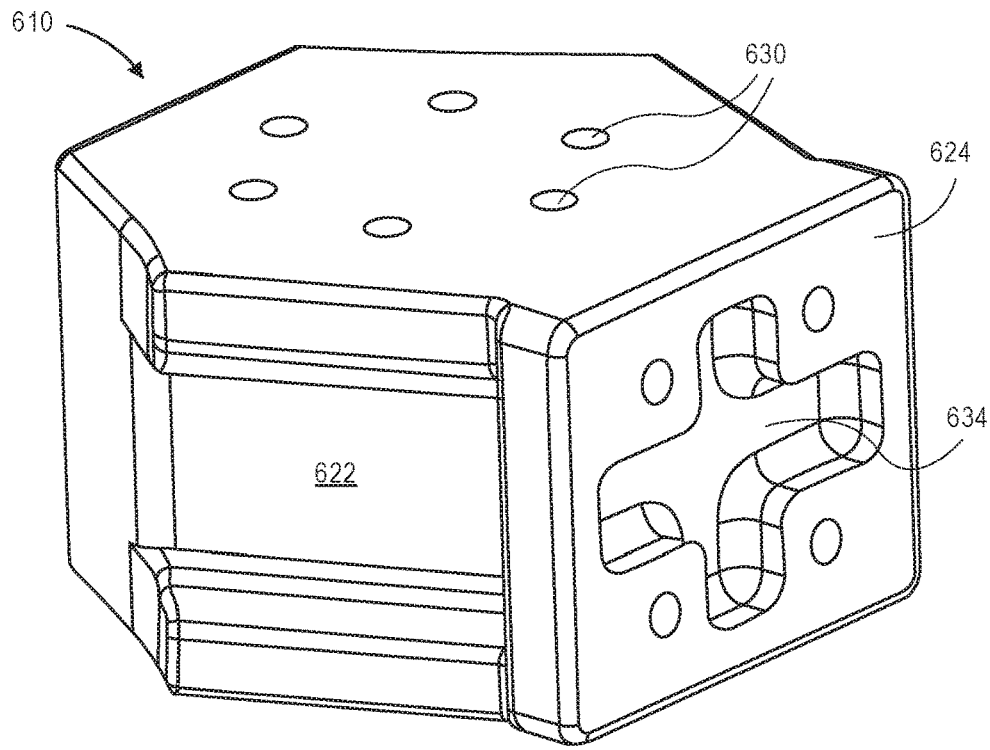
FIG. 7 depicts a rotated perspective view of the attachment device shown in FIG. 6, according to an embodiment.

FIG. 7 depicts a rotated perspective view of the attachment device 610 shown in FIG. 6, according to an embodiment. A second additional recess 634 is shown in the outer surface 624 of the attachment device 610. The second additional recess 634 is shown in the shape of a cross; however, as will be appreciated, the shape and size of the additional recesses 632, 634 may vary to reduce the weight of the attachment device 610 without interfering with the structural integrity of the attachment device 610 or interfering with the coupling to the end effector 100 or the tool 300.

Figure 8:
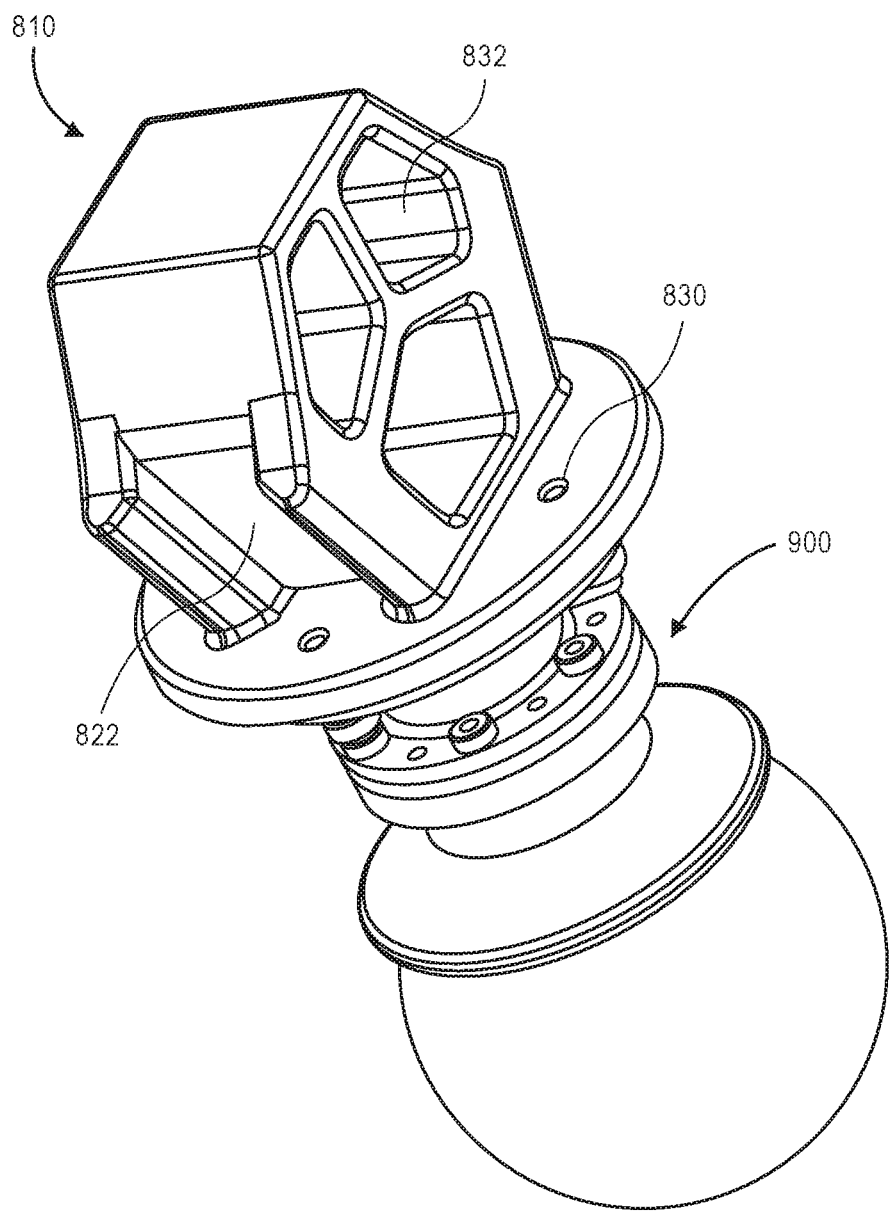
FIG. 8 depicts a perspective view of another attachment device coupled to a tool, according to an embodiment.

FIG. 8 depicts a perspective view of another attachment device 810 coupled to a tool 900, according to an embodiment. The attachment device 810 may have one or more openings 830 formed at least partially therethrough. Fastening devices may be inserted at least partially into or through the openings 830. The fastening devices may also be inserted at least partially into or through corresponding openings in the tool 900. As discussed above, the fastening devices may be screws, bolts or the like. Thus, the fastening devices may be used to couple the attachment device 810 to the tool 900. Although the tool 900 is shown as a jamming gripper, it will be appreciated that multiple other types of tools may also be attached to the attachment device 810. In addition, in some embodiments, two or more tools 900 may be attached to the attachment device 810 at one time.

Figure 9:
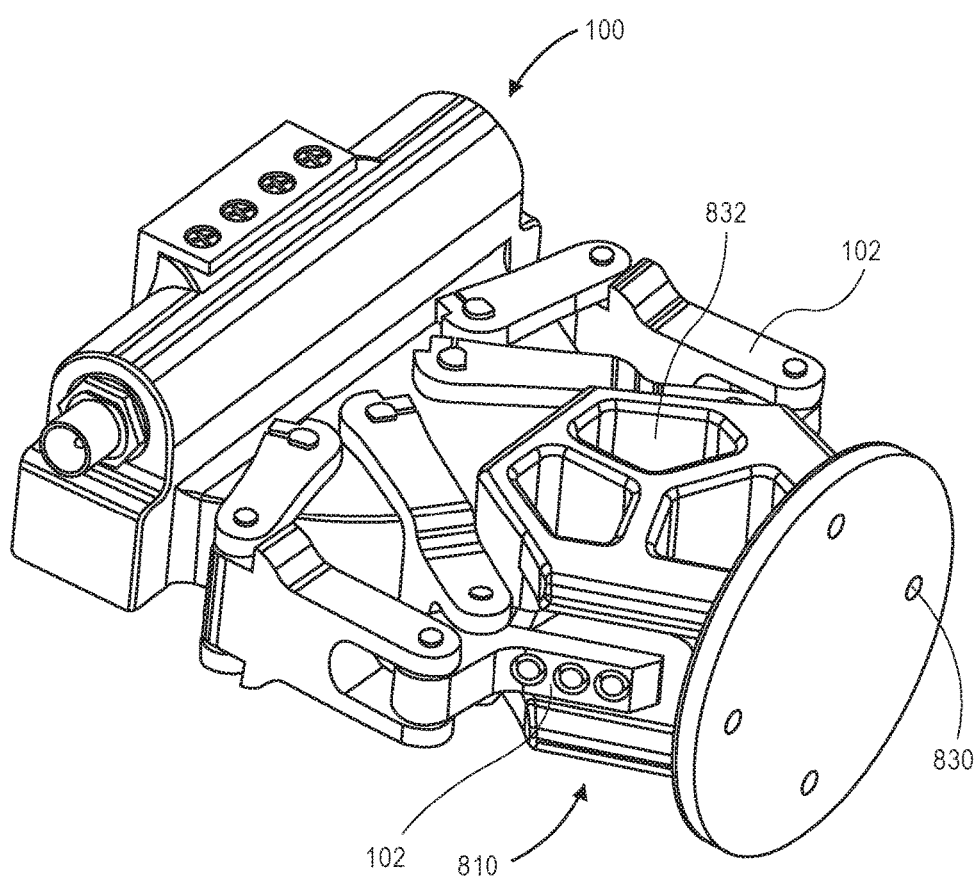
FIG. 9 depicts a perspective view of a robot grasping or engaging the attachment device of FIG. 8, according to an embodiment.

FIG. 9 depicts a perspective view of an end effector 100 of a robot grasping the attachment device 810 of FIG. 8, according to an embodiment. The attachment device 810 may include one or more recesses 822 that are configured to receive the fingers 102 of the end effector 100. The recesses 822 may be similar to the recesses 122 described above. The attachment device 810 may also include one or more additional voids or recesses 832 that are designed to reduce the weight of the attachment device 810. As shown, in FIG. 9, the attachment device 810 includes three additional voids or recesses 832; however, as will be appreciated, the number, size, and location of the additional voids or recesses 832 may vary.

The terms "couple," "coupled," "connect," "connection," "connected," "in connection with," and "connecting" refer to "in direct connection with" or "in connection with via one or more intermediate elements or members." Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An attachment device, comprising:
   a robot-engaging portion having a recess formed in an outer surface thereof for receiving a finger of a robot;
   a tool-engaging portion coupled to the robot-engaging portion, wherein the tool-engaging portion is configured to be coupled to a tool that is to be used by the robot to perform a task; and
   a damping member positioned at least partially between the robot-engaging portion and the tool-engaging portion, wherein the damping member is configured to be adjusted to vary a magnitude of oscillations that are transferred from the tool-engaging portion to the robot-engaging portion.

2. The attachment device of claim 1, wherein the recess comprises two or more recesses formed on opposing sides of the robot-engaging portion.

3. The attachment device of claim 1, wherein a portion of the outer surface of the robot-engaging portion proximate to the recess is sloped or curved to cause the finger of the robot to slide into the recess when the finger of the robot is initially misaligned with the recess.

4. The attachment device of claim 1, wherein the damping member comprises:
   a hollow outer portion; and
   a hollow inner portion that is positioned at least partially within the outer portion.

5. The attachment device of claim 4, wherein the outer portion and the inner portion are made from an elastomeric material.

6. The attachment device of claim 4, wherein the inner portion is made from a softer or less rigid material than the outer portion.

7. The attachment device of claim 4, wherein the tool-engaging portion is positioned at least partially between the inner portion and the outer portion.

8. The attachment device of claim 4, wherein the damping member further comprises a threaded shaft extending at least partially through the inner portion, wherein rotating the shaft adjusts the damping member to vary the magnitude of oscillations that are transferred from the tool-engaging portion to the robot-engaging portion.

9. The attachment device of claim 8, wherein the damping member further comprises a washer positioned around the shaft, and wherein the tool-engaging portion includes a shoulder that is positioned at least partially between the inner portion and the washer.

10. The attachment device of claim 8, wherein the damping member further comprises a bolt positioned around the shaft, wherein the bolt is prevented from rotating due to contact with the robot-engaging portion.

11. An attachment device, comprising:
    a robot-engaging portion having a recess formed in an outer surface thereof for receiving a finger of a robot;
    a tool-engaging portion coupled to the robot-engaging portion, wherein the tool-engaging portion is configured to be coupled to a tool that is to be used by the robot to perform a task; and
    a member comprising:
       a hollow outer portion that is positioned at least partially between the robot-engaging portion and the tool engaging portion; and
       a hollow inner portion that is positioned at least partially within the tool-engaging portion, wherein the hollow outer portion and the hollow inner portion are made from electrically-isolating materials, and wherein the member is configured to be adjusted to vary a magnitude of oscillations that are transferred from the tool-engaging portion to the robot-engaging portion.

12. The attachment device of claim 11, wherein the tool-engaging portion is at least partially positioned within the robot-engaging portion.

13. The attachment device of claim 12, wherein the member further comprises a threaded shaft extending at least partially through the inner portion, wherein rotating the shaft adjusts the member to vary the magnitude of oscillations that are transferred from the tool-engaging portion to the robot-engaging portion.

14. The attachment device of claim 13, wherein the member further comprises:
    a washer positioned around the shaft, wherein the tool-engaging portion includes a shoulder that is positioned at least partially between the inner portion and the washer; and
    a bolt positioned around the shaft, wherein the bolt is prevented from rotating due to contact with the robot-engaging portion.

15. The attachment device of claim 11, wherein member is an electrostatic dissipative element that at least partially prevents electrical pulses from being transmitted from the tool-engaging portion to the robot-engaging portion.

16. A method for performing a task with a robot, comprising:
    coupling an attachment device to a tool, wherein the attachment device comprises:
       a tool-engaging portion configured to be coupled to the tool;
       a robot-engaging portion coupled to the tool-engaging portion, wherein the robot-engaging portion has a recess formed in an outer surface thereof; and
       a damping member positioned at least partially between the robot-engaging portion and the tool-engaging portion;
    moving a finger of the robot such that the finger is received within the recess in the attachment device; and
    adjusting the damping member to vary a magnitude of oscillations that are transferred from the tool to the robot.

17. The method of claim 16, further comprising performing a task with the robot using the tool.

18. The method of claim 17, further comprising moving the finger of the robot such that the finger is withdrawn from the recess, thereby causing the robot to release the attachment device.

19. The method of claim 18, further comprising moving the finger of the robot such that the finger is received within a recess in another attachment device that is coupled to another tool.

20. The method of claim 16, wherein adjusting the damping member comprises turning a shaft that is positioned at least partially within the damping member to vary the magnitude of oscillations that are transferred from the tool to the robot.

* * * * *

UNITED STATES PATENT AND TRADEMARK OFFICE
CERTIFICATE OF CORRECTION

PATENT NO. : 10,384,357 B2
APPLICATION NO. : 15/251736
DATED : August 20, 2019
INVENTOR(S) : Kelleher Guerin Page 1 of 1

It is certified that error appears in the above-identified patent and that said Letters Patent is hereby corrected as shown below:

In the Specification

Column 1, Line 3:
Please add: This invention was made with government support under IIS1227277 awarded by the National Science Foundation. The government has certain rights in the invention.

Signed and Sealed this
Sixth Day of October, 2020

Andrei Iancu
*Director of the United States Patent and Trademark Office*